Aug. 29, 1950

R. L. LEWIS
INSERTABLE SANITARY UNIT FOR
TELEPHONE TRANSMITTERS
Filed July 9, 1948

2,520,416

Inventor
ROY L. LEWIS,

By Parry + Miller
Attorneys

Patented Aug. 29, 1950

2,520,416

UNITED STATES PATENT OFFICE 2,520,416

INSERTABLE SANITARY UNIT FOR TELEPHONE TRANSMITTERS

Roy L. Lewis, Decatur, Ga.

Application July 9, 1948, Serial No. 37,855

5 Claims. (Cl. 179—185)

This invention relates to telephone transmitters and is particularly directed to improving the sanitary properties thereof through replaceable filter elements.

It has heretofore been proposed to provide telephone transmitter mouthpieces with attachments of various types adapted to mouth sanitary paper discs and other filter elements in position to overlie the voice transmitting area of the mouth pieces. According to the present invention the filter element is supported by a telephone mouthpiece itself. That is to say, the mouthpiece cap is designed to seat a filter element. Special means are provided to removably secure the filter element in position. In carrying out the invention special forms of filter elements may advantageously be employed.

The invention will be more fully understood by reference to the illustrative embodiment thereof in the accompanying drawing.

A characterizing feature of the invention is that a filter element is removably mounted within the mouthpiece cap of a telephone transmitter. No external connections or securing means are required so that the mouthpiece may have the appearance of conventional devices of such type. The presence of the filter element can only be detected by looking at the outer end of the mouthpiece. At the same time provision is made whereby the filter element can easily be inserted in and removed from the mouthpiece as will hereafter become apparent.

Figure 1:
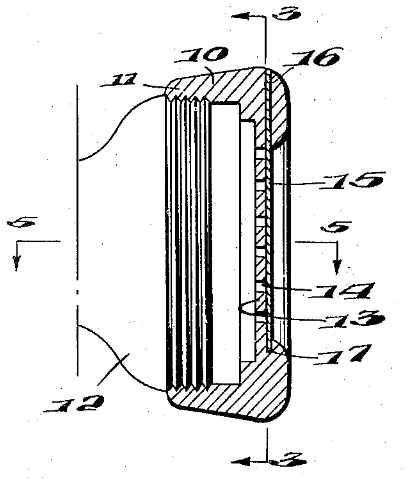
Fig. 1 is a side view, partly in section, and partly in elevation, showing one embodiment of the invention.

Referring now to the drawing, the mouthpiece of the invention, as conventionally, includes an annular body portion 10 having an interiorly threaded flange 11 for attaching the same to a telephone transmitter such as shown at 12 in Fig. 1. The annular body portion 10 surrounds a central apertured voice transmitting area. Such area may be open, or, as shown, include a relatively thin circular portion 13 having multiple voice transmitting perforations 14. Central portion 13 is set in from the outer end of annular body portion 10. The construction so far described is conventional.

Figure 2:
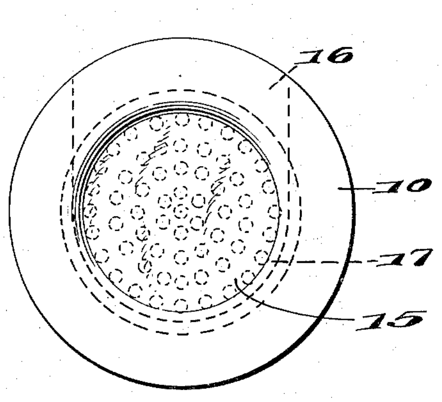
Fig. 2 is a front plan view corresponding to Fig. 1.
Figure 3:
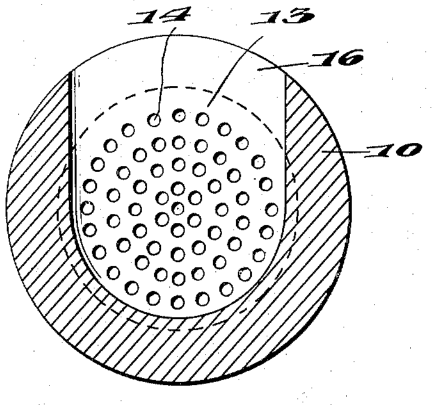
Fig. 3 is a transverse section taken on line 3—3 of Fig. 1.
Figure 4:
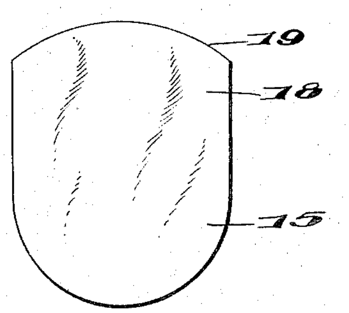
Fig. 4 is a plan view of a preferred form of filter element such as shown in Figs. 1 and 2; and, Fig. 5 is a longitudinal section taken on line 5—5 of Fig. 1.
Figure 5:
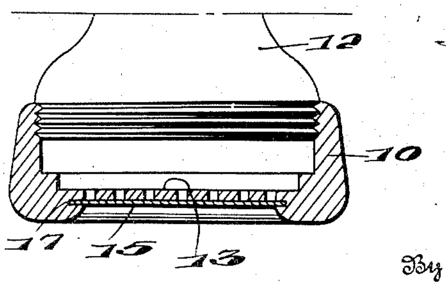

According to the invention, a filter element 15 is removably mounted in the outer end of annular body portion 10 of the mouthpiece so as to overlie the voice transmitting central area. Such filter element is made of flat sheet paper or equivalent material which will not interfere with voice transmission. The filter element is made sufficiently larger than the central area as to be mounted by the annular body portion outwardly thereof. Transverse slot 16 extends throughout the side of the annular body portion 10 for the insertion and removal of the filter element in a radial direction. Extending around the inner periphery of the body portion is a grooved seat 17 adapted to receive the margin of the filter element. Such groove extends around somewhat more than half the circumference of the body portion and connects with slot 16 as best indicated in Fig. 2. Slot 16 is slightly wider than the diameter of the central area.

Filter element 15 is preferably formed to include an integral tongue portion 18 in extension of what would otherwise be a circular disc. Such tongue portion seats in slot 16 and the outer edge 19 thereof may be made to the curvature of the outer periphery of the annular body portion 10 at the plane of the slot although the latter is not essential. Because of the circumferential width and depth of slot 16 substantial support is afforded thereby to the filter element. The provision of the seating groove 17 for additional supporting of the filter element is not entirely necessary, particularly where, as shown, the central area of the mouthpiece includes perforated portion 13 immediately below the slot so that the filter element can rest thereagainst.

Since transmitter mouthpieces are moulded of plastic materials the modification of the construction thereof herein described to incorporate the filter elements, may be provided in the course of moulding, with little, if any, additional expense. The filter elements, which will be removed and replaced at intervals for sanitary reasons, are quite cheap. Thus, in addition to providing for the use of filter elements without detracting from the appearance of the mouthpiece, I have provided a more economical construction than where special attachments for mouthing the filter element are employed.

The embodiment of the invention herein described is merely illustrative. The shape, position, and proportion of parts may be modified within the invention. Accordingly, the scope of the invention is to be determined from the appended claims.

I claim:

1. A sanitary unit for telephone transmitters comprising a transmitter mouthpiece cap having an apertured central area, a flat filter element removably mounted over and covering the outer side of said central area and a transverse slot in the side of the cap through which the filter element is removable.

2. A sanitary unit for telephone transmitters comprising a transmitter mouthpiece cap having an annular body portion surrounding an apertured central area, a transverse slot at least as wide as the apertured central area, extending through the side of the annular body portion and a removable filter element extending through the slot and covering the apertured central area.

3. A sanitary unit for telephone transmitters comprising a transmitter mouthpiece cap having an annular body portion surrounding a perforated circular central portion, said central circular portion being of less thickness than the annular body portion and being located below the outer end of the annular body portion, a transverse slot at least as wide as the central circular portion extending through the side of the annular body portion on the outer side of the central circular portion and a removable flat filter element covering the central circular portion, said filter element having a semicircular edge engageable with the half of the inner periphery of the annular body portion diametrically opposite the slot and having an integral tongue portion extending from the semicircular edge and seating in the slot.

4. A sanitary unit for telephone transmitters comprising a transmitter mouthpiece cap having an annular body portion surrounding an apertured central area, a grooved seat in the inner periphery of the annular body portion surrounding the apertured central area, a transverse slot extending through the side of the annular body portion and communicating with the grooved seat, and a filter element detachably mounted in said grooved seat to cover the apertured central area and being removable through the slot.

5. A mouthpiece cap for telephone transmitters for use with a filter element comprising an annular body portion surrounding an apertured central area, a grooved seat for a filter element on the inner periphery of the annular body portion outwardly of the apertured central area and a transverse slot at least as wide as the apertured central area extending through the side of the annular body portion and communicating with the seat for the insertion of a filter element to engaging position with the seat.

ROY L. LEWIS.

REFERENCES CITED

The following references are of record in the file of this patent:

UNITED STATES PATENTS

| Number | Name | Date |
|---|---|---|
| 902,896 | McBrine | Nov. 3, 1908 |
| 932,545 | Huff | Aug. 31, 1909 |
| 1,244,977 | Goertz | Oct. 30, 1917 |
| 1,340,661 | Lobl | May 18, 1920 |
| 1,537,886 | Sackl | May 12, 1925 |
| 1,946,617 | Elboz | Feb. 13, 1934 |
| 2,045,674 | Parkin | June 30, 1936 |
| 2,212,349 | Mayer | Aug. 20, 1940 |